(12) United States Patent
Teo et al.

(10) Patent No.: US 10,703,112 B2
(45) Date of Patent: Jul. 7, 2020

(54) IMAGE TO SCRIPT CONVERTER

(71) Applicant: Datamax-O'Neil Corporation, Orlando, FL (US)

(72) Inventors: Boon Keat Teo, Singapore (SG); Rudy Ye Ru Koh, Singapore (SG); Shufeng Zheng, Singapore (SG); Anchela Yap, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 15/839,913

(22) Filed: Dec. 13, 2017

(65) Prior Publication Data
US 2019/0176483 A1     Jun. 13, 2019

(51) Int. Cl.
*G06F 3/12* (2006.01)
*B41J 3/407* (2006.01)
*B41J 3/01* (2006.01)

(52) U.S. Cl.
CPC ............ *B41J 3/4075* (2013.01); *B41J 3/01* (2013.01); *G06F 3/1203* (2013.01); *G06F 3/1205* (2013.01); *G06F 3/1253* (2013.01); *G06F 3/1268* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 5,602,377 A | * | 2/1997 | Beller ............... G06K 1/121 235/385 |
| 6,832,725 B2 | | 12/2004 | Gardiner et al. |
| 7,128,266 B2 | | 10/2006 | Zhu et al. |

(Continued)

FOREIGN PATENT DOCUMENTS

| WO | 2004/068368 A1 | 8/2004 |
|---|---|---|
| WO | 2013163789 A1 | 11/2013 |

OTHER PUBLICATIONS

Zebra Technologies; "Print Station for Android; Software note", downloaded from https://www.zebra.com/content/dam/zebra/manuals/en-us/software/print-station-ug-en.pdf on Feb. 25, 2017; 17 pages.

(Continued)

*Primary Examiner* — Dung D Tran
(74) *Attorney, Agent, or Firm* — Alston & Bird LLP

(57) ABSTRACT

Methods for converting an image to source script are provided. Generally applied to thermal printers, the methods may assist users in reproducing or amending a label without actual source script. In one embodiment, a mobile device comprising a software application may be able to scan an image, for example a barcode label. The software application may use an image processing library to recognize smart object fields in the captured image, including text, barcodes, image and shapes and then may translate the smart object information to a printing language script automatically. The application may provide the capability to a user to adjust the parameters specific to each of the identified smart objects. Once the user makes the necessary changes, a script file may be generated based on the updated smart object information. Then, the label may be sent to a printer from the application itself.

18 Claims, 2 Drawing Sheets

(56) References Cited

U.S. PATENT DOCUMENTS

| | | | |
|---|---|---|---|
| 7,159,783 B2 | 1/2007 | Walczyk et al. |
| 7,413,127 B2 | 8/2008 | Ehrhart et al. |
| 7,664,321 B2 | 2/2010 | Fukuoka et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,811,711 B2 * | 8/2014 | Calman ............... G06Q 20/042 |
| | | 382/135 |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |

(56) References Cited

U.S. PATENT DOCUMENTS

| | | |
|---|---|---|
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Keamey et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,069 B2 * | 3/2016 | Shigenobu .......... H04N 1/00477 |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| 9,424,461 B1 * | 8/2016 | Yuan .................. G06K 9/00201 |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |

(56) References Cited

U.S. PATENT DOCUMENTS

| | | |
|---|---|---|
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2003/0004946 A1* | 1/2003 | VanDenAvond ....... G06Q 10/10 |
| 2005/0077361 A1* | 4/2005 | Sakai .................... G06K 1/121 |
| | | 235/487 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2013/0043312 A1 | 2/2013 | Van Horn |
| 2013/0056542 A1* | 3/2013 | Gnutzmann ............ G06K 1/121 |
| | | 235/494 |
| 2013/0075168 A1 | 3/2013 | Amundsen et al. |
| 2013/0175341 A1 | 7/2013 | Keamey et al. |
| 2013/0175343 A1 | 7/2013 | Good |
| 2013/0208131 A1* | 8/2013 | Grewal ............... H04N 1/00278 |
| | | 348/207.2 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0022568 A1* | 1/2014 | Nakaya ................... B65C 9/46 |
| | | 358/1.6 |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |

(56) References Cited

U.S. PATENT DOCUMENTS

| | | |
|---|---|---|
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0145916 A1* | 5/2015 | Ando ............... B41J 3/4075 347/16 |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2015/0363625 A1* | 12/2015 | Wu ............... G06K 7/146 382/203 |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0098238 A1 | 4/2016 | Grandil |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0163098 A1* | 6/2016 | Blanchflower ......... G06T 15/50 345/419 |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |

(56) References Cited

U.S. PATENT DOCUMENTS

| | | |
|---|---|---|
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091705 A1* | 3/2017 | Jones ............... G06F 17/30106 |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delano et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2018/0077300 A1* | 3/2018 | Asai ............... H04N 1/00225 |
| 2019/0132402 A1* | 5/2019 | Sato ............... G06Q 30/0601 |

OTHER PUBLICATIONS

Brother Industries, Ltd.; "iPrint & Label Application Guide for iOS," Ver.1.1 Dated Apr. 25, 2012; 15 pages [Downloaded from http://www.brother-usa.com/downloads/android-app-label-printing.aspx].

Seagull Scientific Inc., "BarTender Brochure" 4 pages, Copyrighted 2016 [Downloaded from https://www.seagullscientific.com/about-us/news/2016/bartender-print-portal-app-delivers-powerful-and-secure-label-printing-from-any-mobile-device/].

Hamsoft Uganda Business, "Barcode Generator App", 2 pages [Downloaded from https://play.google.com/store/apps/details?id=hamsoft.inc.barcodegen&hl=en on Dec. 12, 2017].

Combined Search and Examination Report in related UK Office Action dated May 16, 2019, pp. 1-7.

* cited by examiner

IMAGE TO SCRIPT CONVERTER

FIELD OF THE INVENTION

The present invention generally relates to printing, and more particularly to improve the efficiency in amending and reproducing a label.

BACKGROUND

Generally speaking, it can be difficult to amend and reproduce a label without access to the actual source script. Customers who wish to print a certain label may have to use a software program to create the label. The user may know what kind of label the user desires, but to create the label, the user would first have to learn a new software program or a new printer language before able to create the label. This task may require a significant amount of time to learn the new program or language. In some cases, the user may only want to change a small portion of an existing label design. If the source code or source file of the original label cannot be found, or difficult to retrieve, the user may have to redesign or re-code every single element of the original label.

Therefore, a need exists for a method/apparatus to quickly and accurately amend and reproduce a label without access to the actual source script.

SUMMARY

Accordingly, in one aspect, the present invention embraces an image to script converter for thermal printers to assist users in reproducing or amending a label without actual source script. A device, for example but not limited to, a mobile device, a smart phone, a smart mobile phone, or a computer, may comprise a software application that may be able to scan the image of a barcode label, or capture by a camera a photograph of the label. The software application may use an image processing library to recognize smart object fields in the captured image, then may translate the smart object information to a printing language script automatically.

In an exemplary embodiment, a method may comprise capturing, by a device, an image of a label; processing, by the device, the image with an image processor; identifying, by the device, smart objects in the captured image, wherein the smart objects include text, barcodes, shapes and smart object images. In response to a user of the device deciding not to configure the smart objects, the device automatically generates a source script file based on smart object information, and in response to the user of the device deciding to configure the identified smart objects, updating, by the user, the smart object information, and then the device automatically generates the source script file based on the updated smart object information; and transferring, by the device, the generated source script file based on the smart object information or the updated smart object information to a printer.

The method may further comprise the following: Updating, by the device the smart object information may include adjusting parameters specific to each of the identified smart objects. The device, which comprises a processor, may utilize one or more applications that reside on the device and/or are web-based applications. The one or more applications may be supported by an iOS software platform and/or an Android software platform that recognize field information of the smart objects, and translates the field information to a printing language script. The iOS software platform and/or the Android software platform may utilize an open source open-CV image processing library to recognize the field information of the smart objects and to translate the field information to printing language script. Printing language script utilized in the generated source script file may be Honeywell Fingerprint language. The printer may reproduce a replica printed image of the label by generating a printing language script.

In another exemplary embodiment, a user may decide whether or not to configure the identified smart objects. In response to the user deciding not to configure the identified smart objects, the device may automatically generate the source script file based on the smart object information. In response to the user deciding to configure the identified smart objects, the device may update the smart object information and then may automatically generate the source script file based on the updated smart object information. In response to the smart objects not being identified in the captured image, the method may be terminated.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
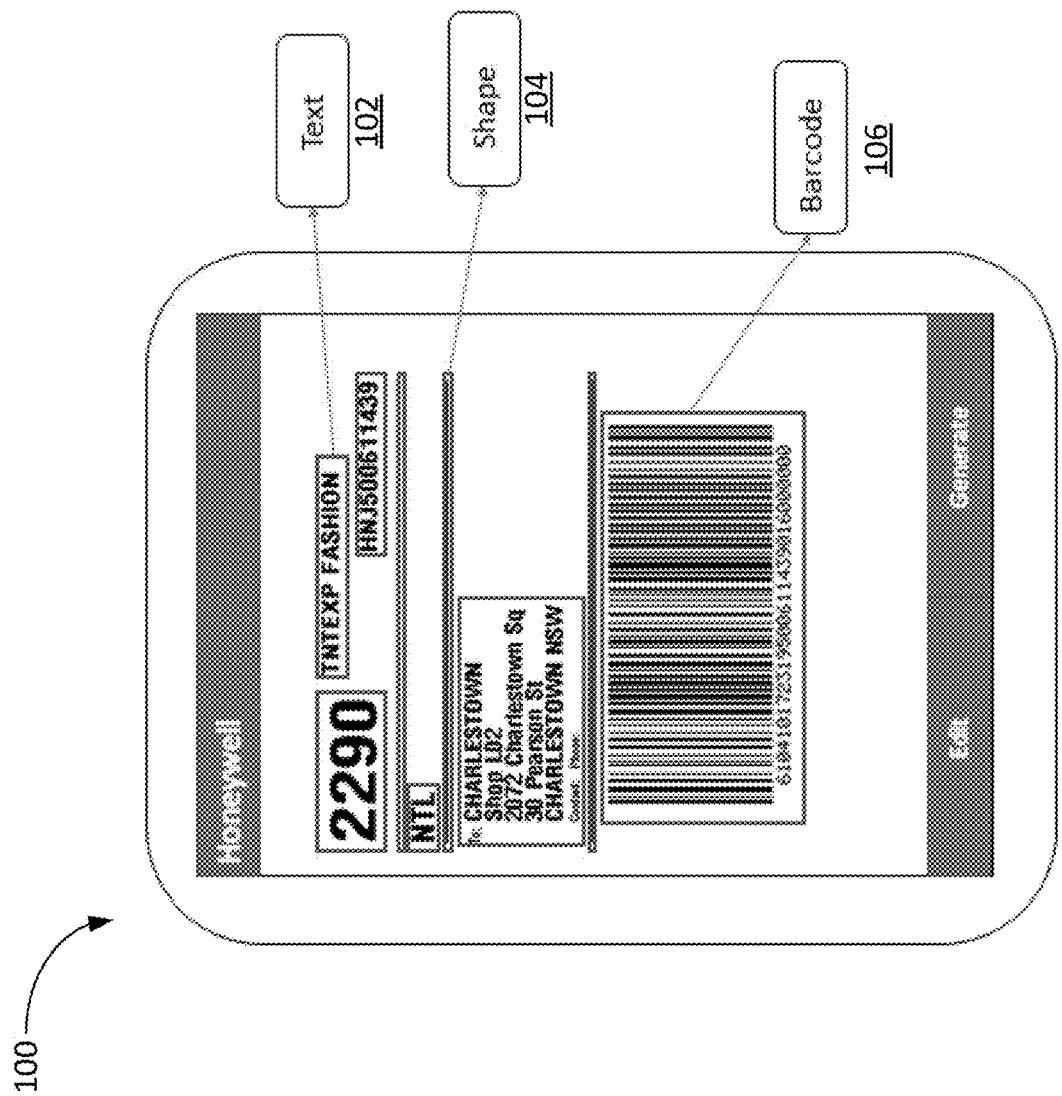
FIG. 1 illustrates an exemplary embodiment of a product label comprising smart objects.

The present invention embraces an image to script converter for thermal printers to assist users in reproducing or amending a label without actual source script. A device, for example but not limited to, a mobile device, a smart phone, a smart mobile phone, or a computer, may comprise a software application that may be able to scan the image of a barcode label, or capture by a camera a photograph of the label. The software application may use an image processing library to recognize smart object fields in the captured image, namely text, barcodes, smart object images and shapes and then may translate the smart object information to a printing language script automatically. The application may provide the capability to a user to adjust the parameters specific to each of the identified smart objects and once the user makes the necessary changes, a source script file may be generated based on the updated smart object information. Then, the label may be sent to a printer from the application itself. The application also may store multiple printer languages to accommodate printing to different printers. In other words, with smart object images and shapes the user may make changes to the image and/or shape. The changes may include, but without limitations scaling, re-positioning and/or even replacing with another image/shape. Other embodiments of the present invention may include, but without limitations various types of media and documents.

In other words, embodiments of the present invention may require a device to be capable of capturing an image and associated application software to be capable to process the image. Additionally, the associated application software allows the scanned image or photograph to be automatically translated to a printer language script. Users may change content of the script without having to design the whole script. An example embodiment may be changing a one dimensional bar code to a two dimensional bar code. The present invention may not create a replica of the actual source script, but may create another source script capable of generating a replica printed image. The associated application software may reside on the device or may be one or more web-based application.

With the present invention, a user does not need to learn any printer specific languages to edit or create a label. In an embodiment, the user may simply take a snapshot of an existing label and edit the label in real-time. The images may be converted and saved in a supported printer language script, e.g., for example, but not limited to Honeywell Fingerprint language. In other embodiments, the present invention may be implemented to create source scripts of other languages. Information may be added that allows the user to choose which printing command language that they wish to output. And if the user wants to print the output directly to a connected printer, the software may be able to retrieve information from the connected printer and output the appropriate format so that the printer can print.

The mobile application may be designed, for example, but not limited to, for an iOS/Android software platform, using the open source open-CV image processing library to recognize field information of smart objects, and then translate to a Fingerprint printing language script. (CV is Computer Vision). The user may also be able to edit the smart objects with different parameters before generating the script.

The smart objects may be categorized into 4 different categories, such as barcodes, text, shapes, and smart object images. An image may be a picture, for example, but not limited to, a company logo. The parameters, as specified per the open source open-CV image processing library, may be specific to each of the identified smart object, for example, but not limited to, barcodes including different types of barcodes types such as datamatrix, QR codes, code 39, code 128 and etc. The user may decide to configure the identified smart objects. If the user decides to configure the smart objects, the device proceeds to update smart object information. Whether or not the user decides to configure the identified smart objections, the device automatically generates the source script file.

FIG. 1 illustrates exemplary embodiment of label 100 comprising a several smart objects, including text 102, shapes 104, and barcodes 106. Smart objects may refer to the elements that are successfully identified as modifiable elements. For example, a barcode may be identified as an image or a smart-object-barcode. A smart object may be represented by a scripting source language, while an image may only be represented by byte data. If an object has scripting source language, it may have greater options for modifications via changing fields and variables in the scripting source language. An image on the other hand, may have limited options for modifications, etc. height, or width size, rotation.

Figure 2:
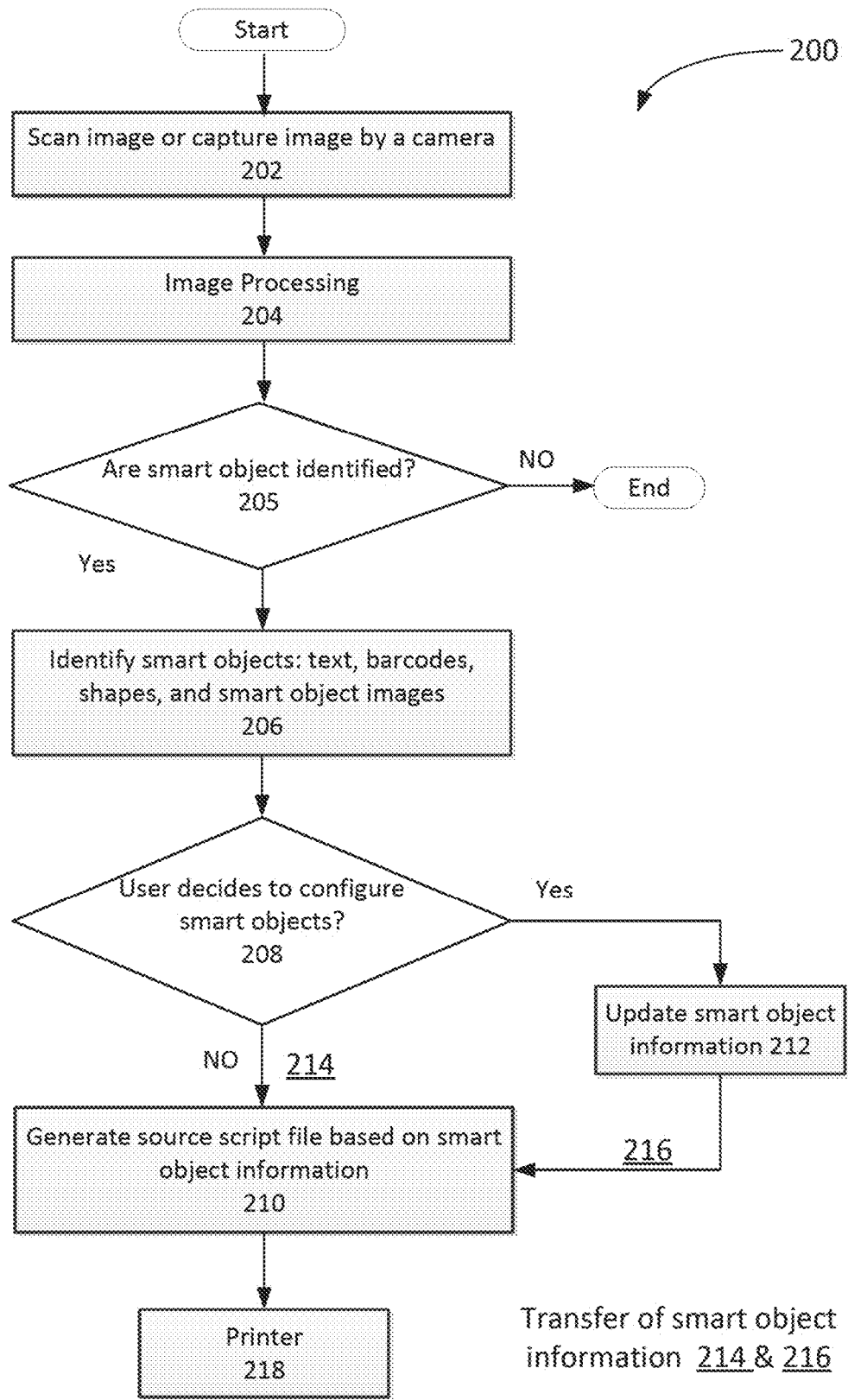
FIG. 2 illustrates an exemplary embodiment of a flowchart for converting an image to source script.

FIG. 2 illustrates exemplary embodiment of flowchart 200 that describes a method to convert an image to source script representing the image.

The method may include a user and a device. The device may be a mobile device or a computer that may utilize an associated application. The associated application may be an application that resides in the device, or may be a web-based application. The device may include a camera or a scanner, and may be operable to capture a photographic image of the item, or may be operable to scan an image of the item, e.g. for a barcode. The scanner may be an office document scanner in which the scanned result is an image. The camera may be associated with a mobile phone. The method comprises the following steps:

Capturing or acquiring a photograph (photo) or image of the label or other item. (step 202) This step may include scanning a barcode of a label or taking a photograph of the label.

Processing the image with an image processor associated with the device, or web-based imaging software. (step 204)

Determining if smart objects can be identified. (step 205). If smart objects cannot be identified, the method terminates.

If smart objects can be identified, identifying the smart objects in the photo/image. The smart objects may include text, barcodes, smart object images, and shapes. (step 206)

The user may decide to configure the smart objects, or not. (step 208)

In response to the user deciding not to configure the identified smart objects, the application may proceed to automatically generate a source script file based on the smart object information. (step 210)

In response to the user deciding to configure the identified smart objects, the application may update the smart object information. This update may include adjusting parameters specific to each of the identified smart objects. (step 212) The application then proceeds to automatically generates a source script file based on the updated smart object information. (step 210)

The generated source script file is transferred to a printer for a print operation. (step 218)

Hence, once the smart object information is available, it may be transferred automatically in step 214 (or step 216) to a script file generator causing each object to be converted to information that will form up the source script file. (step 210)

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678;

8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140; U.S. Design Pat. No. D702,237; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D734,339; U.S. Design Pat. No. D737,321; U.S. Design Pat. No. D754,205; U.S. Design Pat. No. D754,206; U.S. Design Pat. No. D757,009; U.S. Design Pat. No. D760,719; U.S. Design Pat. No. D762,604; U.S. Design Pat. No. D766,244; U.S. Design Pat. No. D777,166; U.S. Design Pat. No. D771,631; U.S. Design Pat. No. D783,601; U.S. Design Pat. No. D785,617; U.S. Design Pat. No. D785,636; U.S. Design Pat. No. D790,505; U.S. Design Pat. No. D790,546; International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0125853; U.S. Patent Application Publication No. 2014/0125999; U.S. Patent Application Publication No. 2014/0129378; U.S. Patent Application Publication No. 2014/0131443; U.S. Patent Application Publication No. 2014/0133379; U.S. Patent Application Publication No. 2014/0136208; U.S. Patent Application Publication No. 2014/0140585; U.S. Patent Application Publication No. 2014/0152882; U.S. Patent Application Publication No. 2014/0158770; U.S. Patent Application Publication No. 2014/0159869; U.S. Patent Application Publication No. 2014/0166759; U.S. Patent Application Publication No. 2014/0168787; U.S. Patent Application Publication No. 2014/0175165; U.S. Patent Application Publication No. 2014/0191684; U.S. Patent Application Publication No. 2014/0191913; U.S. Patent Application Publication No. 2014/0197304; U.S. Patent Application Publication No. 2014/0214631; U.S. Patent Application Publication No. 2014/0217166; U.S. Patent Application Publication No. 2014/0231500; U.S. Patent Application Publication No. 2014/0247315; U.S. Patent Application Publication No. 2014/0263493; U.S. Patent Application Publication No. 2014/0263645; U.S. Patent Application Publication No. 2014/0270196; U.S. Patent Application Publication No. 2014/0270229; U.S. Patent Application Publication No. 2014/0278387; U.S. Patent Application Publication No. 2014/0288933; U.S. Patent Application Publication No. 2014/0297058; U.S. Patent Application Publication No. 2014/0299665; U.S. Patent Application Publication No. 2014/0332590; U.S. Patent Application Publication No. 2014/0351317; U.S. Patent Application Publication No. 2014/0362184; U.S. Patent Application Publication No. 2014/0363015; U.S. Patent
Application Publication No. 2014/0369511; U.S. Patent
Application Publication No. 2014/0374483; U.S. Patent
Application Publication No. 2014/0374485; U.S. Patent
Application Publication No. 2015/0001301; U.S. Patent
Application Publication No. 2015/0001304; U.S. Patent
Application Publication No. 2015/0009338; U.S. Patent
Application Publication No. 2015/0014416; U.S. Patent
Application Publication No. 2015/0021397; U.S. Patent
Application Publication No. 2015/0028104; U.S. Patent
Application Publication No. 2015/0029002; U.S. Patent
Application Publication No. 2015/0032709; U.S. Patent
Application Publication No. 2015/0039309; U.S. Patent
Application Publication No. 2015/0039878; U.S. Patent
Application Publication No. 2015/0040378; U.S. Patent
Application Publication No. 2015/0049347; U.S. Patent
Application Publication No. 2015/0051992; U.S. Patent
Application Publication No. 2015/0053769; U.S. Patent
Application Publication No. 2015/0062366; U.S. Patent
Application Publication No. 2015/0063215; U.S. Patent
Application Publication No. 2015/0088522; U.S. Patent
Application Publication No. 2015/0096872; U.S. Patent
Application Publication No. 2015/0100196; U.S. Patent
Application Publication No. 2015/0102109; U.S. Patent
Application Publication No. 2015/0115035; U.S. Patent
Application Publication No. 2015/0127791; U.S. Patent
Application Publication No. 2015/0128116; U.S. Patent
Application Publication No. 2015/0133047; U.S. Patent
Application Publication No. 2015/0134470; U.S. Patent
Application Publication No. 2015/0136851; U.S. Patent
Application Publication No. 2015/0142492; U.S. Patent
Application Publication No. 2015/0144692; U.S. Patent
Application Publication No. 2015/0144698; U.S. Patent
Application Publication No. 2015/0149946; U.S. Patent
Application Publication No. 2015/0161429; U.S. Patent
Application Publication No. 2015/0178523; U.S. Patent
Application Publication No. 2015/0178537; U.S. Patent
Application Publication No. 2015/0178685; U.S. Patent
Application Publication No. 2015/0181109; U.S. Patent
Application Publication No. 2015/0199957; U.S. Patent
Application Publication No. 2015/0210199; U.S. Patent
Application Publication No. 2015/0212565; U.S. Patent
Application Publication No. 2015/0213647; U.S. Patent
Application Publication No. 2015/0220753; U.S. Patent
Application Publication No. 2015/0220901; U.S. Patent
Application Publication No. 2015/0227189; U.S. Patent
Application Publication No. 2015/0236984; U.S. Patent
Application Publication No. 2015/0239348; U.S. Patent
Application Publication No. 2015/0242658; U.S. Patent
Application Publication No. 2015/0248572; U.S. Patent
Application Publication No. 2015/0254485; U.S. Patent
Application Publication No. 2015/0261643; U.S. Patent
Application Publication No. 2015/0264624; U.S. Patent
Application Publication No. 2015/0268971; U.S. Patent
Application Publication No. 2015/0269402; U.S. Patent
Application Publication No. 2015/0288689; U.S. Patent
Application Publication No. 2015/0288896; U.S. Patent
Application Publication No. 2015/0310243; U.S. Patent
Application Publication No. 2015/0310244; U.S. Patent
Application Publication No. 2015/0310389; U.S. Patent
Application Publication No. 2015/0312780; U.S. Patent
Application Publication No. 2015/0327012; U.S. Patent
Application Publication No. 2016/0014251; U.S. Patent
Application Publication No. 2016/0025697; U.S. Patent
Application Publication No. 2016/0026838; U.S. Patent
Application Publication No. 2016/0026839; U.S. Patent
Application Publication No. 2016/0040982; U.S. Patent
Application Publication No. 2016/0042241; U.S. Patent
Application Publication No. 2016/0057230; U.S. Patent
Application Publication No. 2016/0062473; U.S. Patent
Application Publication No. 2016/0070944; U.S. Patent
Application Publication No. 2016/0092805; U.S. Patent
Application Publication No. 2016/0101936; U.S. Patent
Application Publication No. 2016/0104019; U.S. Patent
Application Publication No. 2016/0104274; U.S. Patent
Application Publication No. 2016/0109219; U.S. Patent
Application Publication No. 2016/0109220; U.S. Patent
Application Publication No. 2016/0109224; U.S. Patent
Application Publication No. 2016/0112631; U.S. Patent
Application Publication No. 2016/0112643; U.S. Patent
Application Publication No. 2016/0117627; U.S. Patent
Application Publication No. 2016/0124516; U.S. Patent
Application Publication No. 2016/0125217; U.S. Patent
Application Publication No. 2016/0125342; U.S. Patent
Application Publication No. 2016/0125873; U.S. Patent
Application Publication No. 2016/0133253; U.S. Patent
Application Publication No. 2016/0171597; U.S. Patent
Application Publication No. 2016/0171666; U.S. Patent
Application Publication No. 2016/0171720; U.S. Patent
Application Publication No. 2016/0171775; U.S. Patent
Application Publication No. 2016/0171777; U.S. Patent
Application Publication No. 2016/0174674; U.S. Patent
Application Publication No. 2016/0178479; U.S. Patent
Application Publication No. 2016/0178685; U.S. Patent
Application Publication No. 2016/0178707; U.S. Patent
Application Publication No. 2016/0179132; U.S. Patent
Application Publication No. 2016/0179143; U.S. Patent
Application Publication No. 2016/0179368; U.S. Patent
Application Publication No. 2016/0179378; U.S. Patent
Application Publication No. 2016/0180130; U.S. Patent
Application Publication No. 2016/0180133; U.S. Patent
Application Publication No. 2016/0180136; U.S. Patent
Application Publication No. 2016/0180594; U.S. Patent
Application Publication No. 2016/0180663; U.S. Patent
Application Publication No. 2016/0180678; U.S. Patent
Application Publication No. 2016/0180713; U.S. Patent
Application Publication No. 2016/0185136; U.S. Patent
Application Publication No. 2016/0185291; U.S. Patent
Application Publication No. 2016/0186926; U.S. Patent
Application Publication No. 2016/0188861; U.S. Patent
Application Publication No. 2016/0188939; U.S. Patent
Application Publication No. 2016/0188940; U.S. Patent
Application Publication No. 2016/0188941; U.S. Patent
Application Publication No. 2016/0188942; U.S. Patent
Application Publication No. 2016/0188943; U.S. Patent
Application Publication No. 2016/0188944; U.S. Patent
Application Publication No. 2016/0189076; U.S. Patent
Application Publication No. 2016/0189087; U.S. Patent
Application Publication No. 2016/0189088; U.S. Patent
Application Publication No. 2016/0189092; U.S. Patent
Application Publication No. 2016/0189284; U.S. Patent
Application Publication No. 2016/0189288; U.S. Patent
Application Publication No. 2016/0189366; U.S. Patent
Application Publication No. 2016/0189443; U.S. Patent
Application Publication No. 2016/0189447; U.S. Patent
Application Publication No. 2016/0189489; U.S. Patent
Application Publication No. 2016/0192051; U.S. Patent
Application Publication No. 2016/0202951; U.S. Patent
Application Publication No. 2016/0202958; U.S. Patent
Application Publication No. 2016/0202959; U.S. Patent
Application Publication No. 2016/0203021; U.S. Patent
Application Publication No. 2016/0203429; U.S. Patent
Application Publication No. 2016/0203797; U.S. Patent
Application Publication No. 2016/0203820; U.S. Patent Application Publication No. 2016/0204623; U.S. Patent Application Publication No. 2016/0204636; U.S. Patent Application Publication No. 2016/0204638; U.S. Patent Application Publication No. 2016/0227912; U.S. Patent Application Publication No. 2016/0232891; U.S. Patent Application Publication No. 2016/0292477; U.S. Patent Application Publication No. 2016/0294779; U.S. Patent Application Publication No. 2016/0306769; U.S. Patent Application Publication No. 2016/0314276; U.S. Patent Application Publication No. 2016/0314294; U.S. Patent Application Publication No. 2016/0316190; U.S. Patent Application Publication No. 2016/0323310; U.S. Patent Application Publication No. 2016/0325677; U.S. Patent Application Publication No. 2016/0327614; U.S. Patent Application Publication No. 2016/0327930; U.S. Patent Application Publication No. 2016/0328762; U.S. Patent Application Publication No. 2016/0330218; U.S. Patent Application Publication No. 2016/0343163; U.S. Patent Application Publication No. 2016/0343176; U.S. Patent Application Publication No. 2016/0364914; U.S. Patent Application Publication No. 2016/0370220; U.S. Patent Application Publication No. 2016/0372282; U.S. Patent Application Publication No. 2016/0373847; U.S. Patent Application Publication No. 2016/0377414; U.S. Patent Application Publication No. 2016/0377417; U.S. Patent Application Publication No. 2017/0010141; U.S. Patent Application Publication No. 2017/0010328; U.S. Patent Application Publication No. 2017/0010780; U.S. Patent Application Publication No. 2017/0016714; U.S. Patent Application Publication No. 2017/0018094; U.S. Patent Application Publication No. 2017/0046603; U.S. Patent Application Publication No. 2017/0047864; U.S. Patent Application Publication No. 2017/0053146; U.S. Patent Application Publication No. 2017/0053147; U.S. Patent Application Publication No. 2017/0053647; U.S. Patent Application Publication No. 2017/0055606; U.S. Patent Application Publication No. 2017/0060316; U.S. Patent Application Publication No. 2017/0061961; U.S. Patent Application Publication No. 2017/0064634; U.S. Patent Application Publication No. 2017/0083730; U.S. Patent Application Publication No. 2017/0091502; U.S. Patent Application Publication No. 2017/0091706; U.S. Patent Application Publication No. 2017/0091741; U.S. Patent Application Publication No. 2017/0091904; U.S. Patent Application Publication No. 2017/0092908; U.S. Patent Application Publication No. 2017/0094238; U.S. Patent Application Publication No. 2017/0098947; U.S. Patent Application Publication No. 2017/0100949; U.S. Patent Application Publication No. 2017/0108838; U.S. Patent Application Publication No. 2017/0108895; U.S. Patent Application Publication No. 2017/0118355; U.S. Patent Application Publication No. 2017/0123598; U.S. Patent Application Publication No. 2017/0124369; U.S. Patent Application Publication No. 2017/0124396; U.S. Patent Application Publication No. 2017/0124687; U.S. Patent Application Publication No. 2017/0126873; U.S. Patent Application Publication No. 2017/0126904; U.S. Patent Application Publication No. 2017/0139012; U.S. Patent Application Publication No. 2017/0140329; U.S. Patent Application Publication No. 2017/0140731; U.S. Patent Application Publication No. 2017/0147847; U.S. Patent Application Publication No. 2017/0150124; U.S. Patent Application Publication No. 2017/0169198; U.S. Patent Application Publication No. 2017/0171035; U.S. Patent Application Publication No. 2017/0171703; U.S. Patent Application Publication No. 2017/0171803; U.S. Patent Application Publication No. 2017/0180359; U.S. Patent Application Publication No. 2017/0180577; U.S. Patent Application Publication No. 2017/0181299; U.S. Patent Application Publication No. 2017/0190192; U.S. Patent Application Publication No. 2017/0193432; U.S. Patent Application Publication No. 2017/0193461; U.S. Patent Application Publication No. 2017/0193727; U.S. Patent Application Publication No. 2017/0199266; U.S. Patent Application Publication No. 2017/0200108; and U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. A method, comprising:
   capturing, by a device, an image of a label, the label comprising original script associated with a first printing command language;
   identifying, by the device, a plurality of smart objects in the captured image of the label, wherein the plurality of smart objects comprises individually modifiable elements of the label, and wherein the individually modifiable elements comprise at least one of a text, a barcode, a shape and a smart object image;
   in response to receiving an input from a user of the device to modify a first smart object in the identified plurality of smart objects, updating the first smart object;
   automatically generating, by the device, a source script file based on the updated first smart object, wherein the source script file is generated in a second printing command language selected by the user; and
   transferring, by the device, the generated source script file to a printer for printing.

2. The method according to claim 1, further comprising updating, by the device, the first smart first object by adjusting parameter specific to the first smart object.

3. The method according to claim 1, further comprising utilizing an application stored on the device or a web-based application.

4. The method according to claim 3, wherein, the application is supported by an iOS software platform and/or an Android software platform that recognize field information of the plurality of smart objects and translate the field information to a printing language script.

5. The method according to claim 4, wherein, the iOS software platform or the Android software platform utilizes an open source open-CV image processing library to recognize the field information of the plurality of smart objects and to translate the field information to the printing language script.

6. The method according to claim 1, wherein the second printing command language utilized in the generated source script file is Honeywell Fingerprint language.

7. The method according to claim 1, wherein the printer reproduces a replica printed image of the label by generating the printing language script with the updated first smart object.

8. A method, comprising:
   capturing, by a device, an image of a label, the label comprising an original script associated with a first printing command language;

identifying, by the device, a plurality of smart objects in the captured image of the label, wherein the plurality of smart objects comprises of individually modifiable elements of the label;

generating, by the device, a source script file based on a modified element in a smart object in the captured image, wherein the source script file is generated in a second printing command language selected by the user; and transferring, by the device, the generated source script file to a printer for printing.

9. The method according to claim 8, further comprising receiving an input from a user to configure the modifiable elements in the identified plurality of smart objects.

10. The method according to claim 9, further comprising, in response to receiving input from a user to not configure the modifiable elements in the identified plurality of smart objects, automatically generating, by the device, the source script file based on smart object information.

11. The method according to claim 8, comprising, in response to the smart objects not being identified in the captured image, terminating the method.

12. The method according to claim 8, wherein the plurality of smart objects includes a text, a barcode, a shape and a smart object image.

13. The method according to claim 8, wherein the device is a mobile device comprising a scanner and/or a camera.

14. A method, comprising:
acquiring an image of a label using a device, the label comprising original script associated with a first printing command language;

activating the device to process the image and identify a plurality of smart objects in the image, the plurality of smart objects comprising individually modifiable elements of the label;

in response to receiving, at the device, an input from a user to modify an element in a first smart object of the label, updating the first smart object; and automatically generating a source script file based on the modified element in the identified first smart object, wherein the source script file is generated in a second printing command language selected by the user; and transferring, by the device, the source script file to a printer for printing.

15. The method according to claim 14, wherein, the smart object includes at least one of a text, a barcode, a shape and a smart object image.

16. The method according to claim 14, wherein updating the first smart object comprises adjusting parameter specific to the identified first smart object.

17. The method according to claim 14, wherein the device utilizes one of an application stored on the device or a web-based application.

18. The method according to claim 17, wherein, the application is supported by an iOS software platform or an Android software platform that recognize field information of the plurality of smart objects and translate the field information to a printing language script.

* * * * *